(12) United States Patent
Banack et al.

(10) Patent No.: US 10,049,423 B2
(45) Date of Patent: Aug. 14, 2018

(54) GRAPHICS PROCESSING UNIT FAILURE RECOVERY

(71) Applicant: VMware, Inc., Palo Alto, CA (US)

(72) Inventors: Michael Banack, Mountain View, CA (US); Mark Sheldon, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 625 days.

(21) Appl. No.: 13/846,332

(22) Filed: Mar. 18, 2013

(65) Prior Publication Data
US 2014/0267328 A1 Sep. 18, 2014

(51) Int. Cl.
*G06T 1/20* (2006.01)

(52) U.S. Cl.
CPC ..................... *G06T 1/20* (2013.01)

(58) Field of Classification Search
None
See application file for complete search history.

(56) References Cited

U.S. PATENT DOCUMENTS

| | | | | |
|---|---|---|---|---|
| 2003/0011609 A1* | 1/2003 | Deering | | G06F 3/14 345/582 |
| 2008/0303834 A1* | 12/2008 | Swift et al. | | 345/522 |
| 2011/0316863 A1* | 12/2011 | Nishimaki et al. | | 345/505 |
| 2013/0155083 A1* | 6/2013 | McKenzie et al. | | 345/522 |
| 2013/0229419 A1* | 9/2013 | Harris et al. | | 345/501 |

OTHER PUBLICATIONS

Mandl et al, General-purpose Graphics Processing Units Deliver New Capabilities to the Embedded Market, 2011, Citeseer.*
Shucai Xiao et al., Transparent Accelerator Migration in a Virtualized GPU Environment, 2012 12th IEEE/ACM International Symposium on Cluster, Cloud and Grid Computing, 2012, pp. 124-131.
Micah Dowty et al., GPU Virtualization on VMware's Hosted I/O Architecture, ACM SIGOPS Operating Systems Review vol. 43 Issue 3, Jul. 2009, pp. 73-82.
Martin Dimitrov et al., Understanding Software Approaches for GPGPU Reliability, Proceedings of 2nd Workshop on General Purpose Processing on Graphics Processing Units, 2009, 11 pages.
Micah Dowty et al., GPU Virtualization on VMware's Hosted I/O Architecture, Published in the USENIX Workshop on I/O Virtualization 2008, 8 pages.

* cited by examiner

*Primary Examiner* — Xin Sheng
(74) *Attorney, Agent, or Firm* — Nicholson De Vos Webster & Elliott LLP (57) ABSTRACT

Exemplary methods, apparatuses, and systems receive a command from a program to render graphics data on a display device, transmit the command to a graphics processing unit (GPU), and transmit a readback request to the GPU. Upon receiving a response to the readback request from the GPU, the program is alerted that the command has been transmitted to the GPU. The response to the readback request is a pointer to a memory location at which the GPU has written rendered frame data representing the command. In response to receiving notification of a failure of the GPU, the rendered frame data written in response to the readback request and any additional commands to render the additional graphics requests received subsequent to the transmission of the readback request are transmitting to the GPU upon recovery from the failure, or to another GPU.

20 Claims, 5 Drawing Sheets

GRAPHICS PROCESSING UNIT FAILURE RECOVERY

FIELD OF THE INVENTION

The various embodiments described herein relate to graphics processing. In particular, embodiments relate to recovering from a failure of a graphics processing unit.

BACKGROUND OF THE INVENTION

Graphics processing units (GPUs) are designed specifically for performing complex mathematical and geometric calculations, e.g., for graphics rendering. Modern GPUs produce high fidelity images faster than general-purpose central processing units (CPUs). The highly parallel structure of GPUs also makes them more effective than CPUs for algorithms that include processing large blocks of data in parallel. Uses for accelerated graphics, and parallel computing generally, are becoming more important in servers and datacenters. As this trend continues, it will become necessary to protect critical systems from errors caused by GPU failures.

Application programming interfaces (APIs), as a part of the graphics driver architecture, manage pipelined graphics commands and resources received from applications to be rendered by the GPU. In the case of a GPU failure, these APIs notify the application(s) that the application's graphics commands and resources have been lost, e.g. by sending a "DeviceLost" error message. The application(s) are then responsible for recovering from the failure, e.g., by deriving the graphics state at the time of the failure and reissuing the commands and resources to the recovered GPU or another GPU. Leaving the responsibility of recovery to applications can be slow and may lead to inconsistent and often undesirable results, as some applications fail to recover properly.

SUMMARY OF THE INVENTION

Exemplary methods, apparatuses, and systems receive a command from a program to render graphics data on a display device, transmit the command to a GPU, and transmit a readback request to the GPU. In response to receiving a response to the readback request from the GPU, the program is alerted that the command has been transmitted to the GPU. In one embodiment, the response to the readback request includes a pointer to a memory location at which the GPU has written rendered frame data representing the results of the command. In response to receiving notification of a failure of the GPU, the rendered frame data written in response to the readback request and any additional commands to render the additional graphics requests received from the program subsequent to the transmission of the readback request are transmitted to the GPU upon recovery from the failure, or to another GPU. In one embodiment, the readback request is a pipelined readback request and the response to the pipelined readback request is received in response to a query transmitted to the GPU.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein manage pipelined graphics commands received from applications and to be rendered by a GPU. Taking advantage of the asynchronous nature of the pipelined requests, embodiments implement recovery from GPU failure in a manner that is transparent to the applications. In an embodiment in which the GPU failure recovery is implemented in a virtualized environment, the recovery may be implemented in a manner that is transparent to virtual machine as well as the application.

Figure 1:
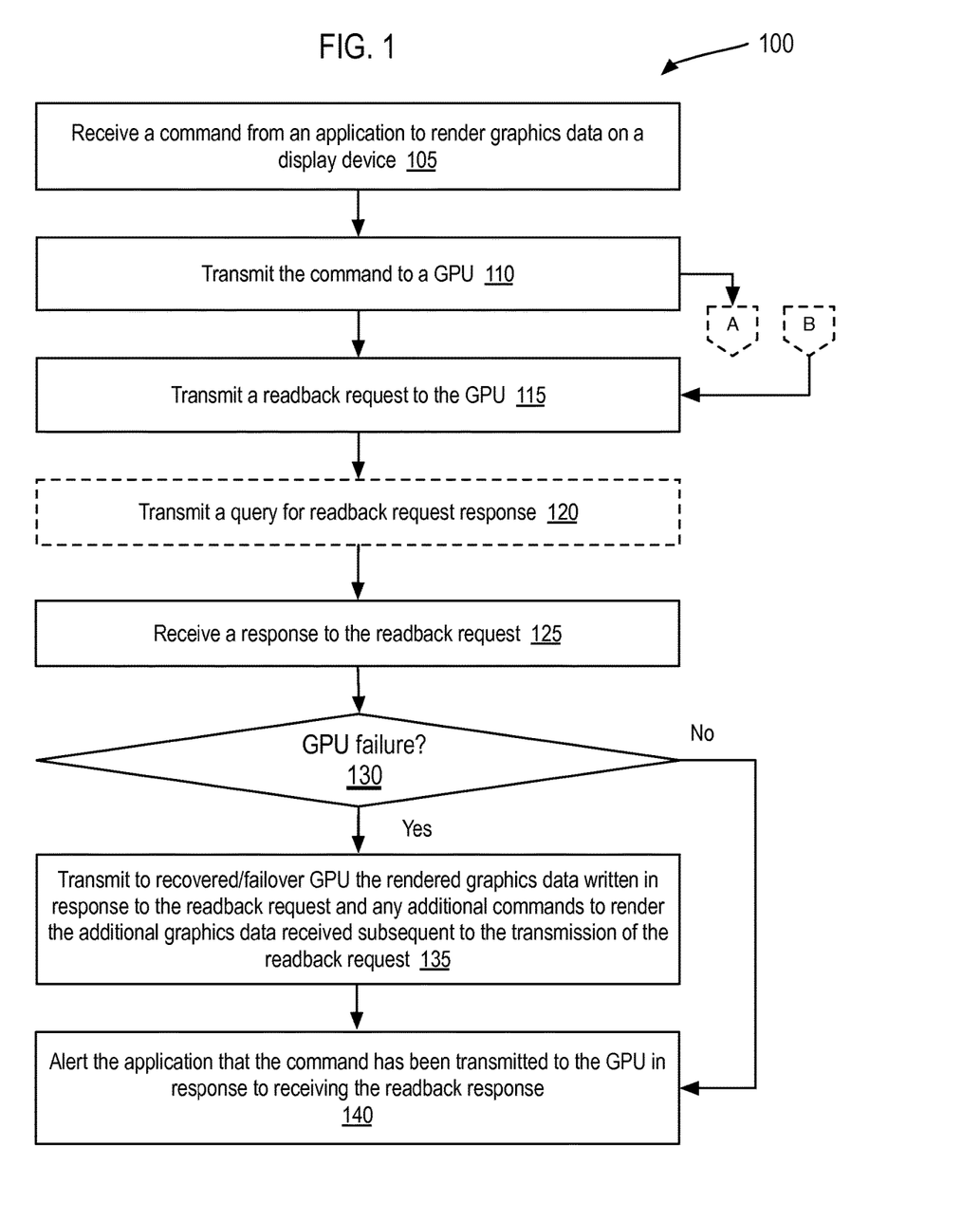
FIG. 1 is a flow chart illustrating an exemplary method of recovering from a GPU failure.
Figure 2:
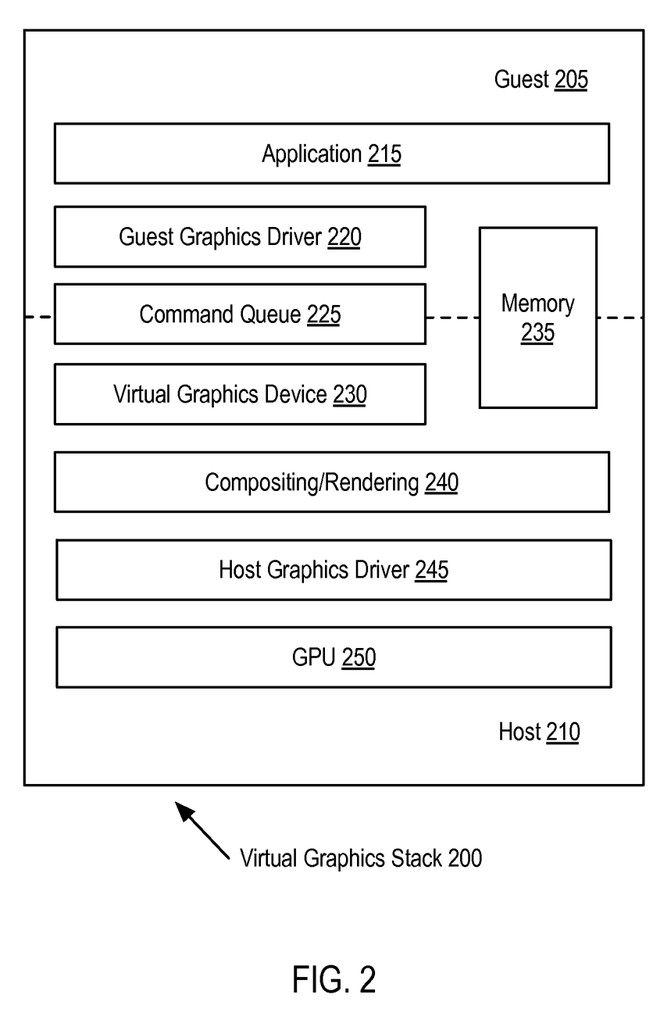
FIG. 2 illustrates, in block diagram form, an exemplary virtual graphics stack.

FIG. 1 is a flow chart illustrating an exemplary method 100 of recovering from a GPU failure. The method 100 may be implemented in virtualized and non-virtualized environments. FIG. 2 illustrates, in block diagram form, an exemplary virtual graphics stack 200 to implement the method 100. For example, virtualization allows one or more virtual machines/guests 205 to run on a common computing hardware platform/host 210. The virtual graphics stack 200 includes components that may also be used to implement a non-virtual graphics stack. Accordingly, both virtualized and non-virtualized implementations of the method 100 will be described with reference to FIG. 2. In virtualized embodiments, the method 100 is performed by the virtual graphics device 230 (e.g., to enable recovery in a manner that is transparent to the guest 205) or, alternatively, by the guest graphics driver 220 (e.g., to enable recovery in a manner that is transparent to the application 215). In non-virtualized embodiments, the host graphics driver 245, which may simply be referred to as the graphics driver in a non-virtualized embodiment, or a similar API performs the method 100.

At block 105, a command is received from an application 215 to render graphics data on a display device. For example, the application 215 utilizes the guest graphics driver 220 or an API to place command data inside of a memory buffer or command queue 225 or a portion of the memory 235 for the virtual graphics device 230 to process asynchronously. As used herein, the terms a command to render graphics data, a command, and a graphics request are used interchangeably. Alternatively, the host graphics driver 245 places the command in the command queue 225 or receives a pointer to a command queue 225 location storing the command from the application 215. In one embodiment, the command is stored in the command queue 225 until the application 215 is alerted that the command has been transmitted to the GPU 250. Upon being alerted, the application 215 may reuse the portion of the command queue 225 storing the command, minimizing the amount of memory needed to maintain the command queue 225.

At block 110, the command is transmitted to the GPU 250 to be rendered on the display device. For example, in a virtualized embodiment, the virtual graphics device 230 processes commands in first in first out (FIFO) order. The virtual graphics device 230 processes the command and transmits the command to the GPU 250. For example, this may include uploading the command to the host graphics driver 245. In one embodiment, the virtual graphics device 230 and/or compositing/rendering layer 240 perform pre-processing of the command prior to transmitting the command to the GPU 250. Alternatively, in a non-virtualized embodiment, the host graphics driver 245 processes and transmits the command to the GPU 250. The guest graphics driver 220, virtual graphics device 230, or host graphics driver 245 normally would alert the application 215 that the command has been transmitted to the GPU 250 or otherwise release the portion of the command queue 225 storing the command. In embodiments described herein, however, the guest graphics driver 220, virtual graphics device 230, or host graphics driver 245 instead delays alerting the application 215, or otherwise releasing the portion of the command queue 225 storing the command, and proceeds to block 115.

At block 115, a readback request is transmitted to the GPU 250 to readback portions of the graphics data into the memory 235. For example, in a virtualized embodiment, the virtual graphics device 230 (or guest graphics driver 220 via the virtual graphics device 230) transmits a readback request to the GPU 250 for one or more commands. Alternatively, in a non-virtualized embodiment, the host graphics driver 245 transmits the readback request. In one embodiment, commands to render graphics data are grouped into batches and the guest graphics driver 220, virtual graphics device 230, or host graphics driver 245 transmits a readback request to the GPU 250 in response to the transmission of each of one or more batches. While the method 100 is described with reference to a command, features of the method 100 may also be performed on batches of commands.

The guest graphics driver 220, virtual graphics device 230, or host graphics driver 245 normally would only transmit a readback request upon receiving an explicit request for a readback from an application 215. In embodiments described herein, however, the guest graphics driver 220, virtual graphics device 230, or host graphics driver 245 instead initiates and transmits a readback request for graphics data after each interval of one or more batches without receiving a readback request from the application 215. Additionally, the guest graphics driver 220, virtual graphics device 230, or host graphics driver 245 delays notifying the application 215 that the command(s) have transmitted to the GPU 250, or otherwise releasing the portion of the command queue 225 storing the command until a response to the readback request is received. Should the application 215 initiate a readback request, e.g., subsequent to one or more of readback requests described with reference to block 115, the application's readback request may also be utilized in a manner similar to a readback request initiated by the guest graphics driver 220, virtual graphics device 230, or host graphics driver 245, as further described below.

In one embodiment, the transmission of the readback request is delayed until the GPU 250 has completed the command to render the graphics data and synchronized with the guest graphics driver 220, virtual graphics device 230, or host graphics driver 245 that sent the command. For example, the GPU 250 receives the transmitted command to render graphics data and processes the command, e.g. via its own pipeline, asynchronously from the guest graphics driver 220, virtual graphics device 230, or host graphics driver 245 processing and transmitting the command. It may take some time after the command was transmitted to the GPU 250, therefore, for the GPU 250 to render the command. Additionally, the guest graphics driver 220, virtual graphics device 230, or host graphics driver 245 may delay sending any further commands until the GPU 250 responds to the readback request. This type of readback request is referred to as being "synchronous" and the resultant delay/blocking of the command stream until the GPU has caught up in the command stream and replies to the readback request may be undesirable. In an alternate embodiment, the guest graphics driver 220, virtual graphics device 230, or host graphics driver 245 transmits an asynchronous or "pipelined" readback request and does not stall sending/block further commands to render graphics data in response to the readback request. As used herein, a pipelined readback request refers to submitting the readback request asynchronously, indicating to the GPU 250 that the GPU 250 may process the readback request when the corresponding display data has been rendered or is otherwise available to be written back in a manner that is accessible to the guest graphics driver 220, virtual graphics device 230, or host graphics driver 245. For example, the GPU 250 may respond to a readback request with a pointer to a memory location storing the display data rendered based, at least in part, upon the command. Additionally, the guest graphics driver 220, virtual graphics device 230, or host graphics driver 245 may continue sending further commands, including additional pipelined readback requests, while the GPU 250 responds to the pipelined readback request.

At block 120, the guest graphics driver 220, virtual graphics device 230, or host graphics driver 245 optionally transmits a query to the host graphics driver 245 or GPU 250 for a response to the readback request. For example, responses to pipelined readback requests may be received in response to the query. Alternatively, the host graphics driver 245 or GPU 250 automatically provides a response to the readback request, e.g., an alert in response to writing the rendered display data to memory, without the query.

At block 125, the guest graphics driver 220, virtual graphics device 230, or host graphics driver 245 receives a response to the readback request. In one embodiment, the response includes a pointer to a memory location storing the display data rendered based, at least in part, upon the command. Alternatively, the response includes the rendered display data. In one embodiment, the rendered display data provided in response to the readback request is stored in the memory 235 and is accessible for recovery from a failure of the GPU 250. In one embodiment, the guest graphics driver 220 or virtual graphics device designates the memory location in which the GPU 250 writes the rendered display data, e.g., when the pipelined readback request is issued. Alternatively, the host graphics driver 245 or the GPU 250 designates the memory location.

At block 130, the guest graphics driver 220, virtual graphics device 230, or host graphics driver 245 detects if a GPU failure has occurred. While shown at block 130, the guest graphics driver 220, virtual graphics device 230, or host graphics driver 245 may detect a GPU failure at various stages of the method 100 and the guest graphics driver 220, virtual graphics device 230, or host graphics driver 245 recovers from the GPU failure as described with reference to block 135. For example, commands to render graphics data may have been sent to the GPU 250 after the transmission of a first readback request and prior to the GPU failure, e.g., when the failure occurs prior to sending a second readback request or prior to receiving a second readback response. These commands have been received from an application 215 and transmitted to the GPU 250 subsequent to the first readback request but have not yet been released from the command queue 225 while waiting for the corresponding second readback request to be transmitted or the second readback response to be received. This situation is more likely to occur in an embodiment in which one readback request is sent for each plurality of batches.

At block 135, if a GPU failure has been detected, the guest graphics driver 220, virtual graphics device 230, or host graphics driver 245 transmits to a functioning GPU (e.g., the recovered GPU 250 or a failover GPU) the rendered graphics data written in response to the readback request (or the most recent readback request) from the memory 235. Any additional commands remaining in the command queue 225 that have not yet been released, e.g., received subsequent to the readback request (or the most recent readback request), are also transmitted/retransmitted to the functioning GPU. As a result, the graphics commands/data needed to recover from the GPU failure are transmitted to the functioning GPU without the alerting the application 215 and relieving the application 215 from the responsibility for the recovery.

At block 140, if a GPU failure has not been detected, the guest graphics driver 220, virtual graphics device 230, or host graphics driver 245 alerts the application 215 that the command has been transmitted to the GPU, or otherwise releases the portion of the command queue 225 storing the command, in response to receiving the readback response. For example, metadata flags may be used to indicate whether a portion of the command queue 225 may be written/overwritten. In an embodiment in which commands are batched, the batch of commands corresponding to the readback response is released from the command queue 225. Delaying the release of the portion of the command queue 225 storing the command until the readback response is received guarantees that, in the event of a GPU failure, a current copy of the graphics data is available in the command queue 225 or, as a result of the readback request, in the memory 235.

The method 100 may be performed serially or in parallel on multiple commands to render graphics.

Figure 3:
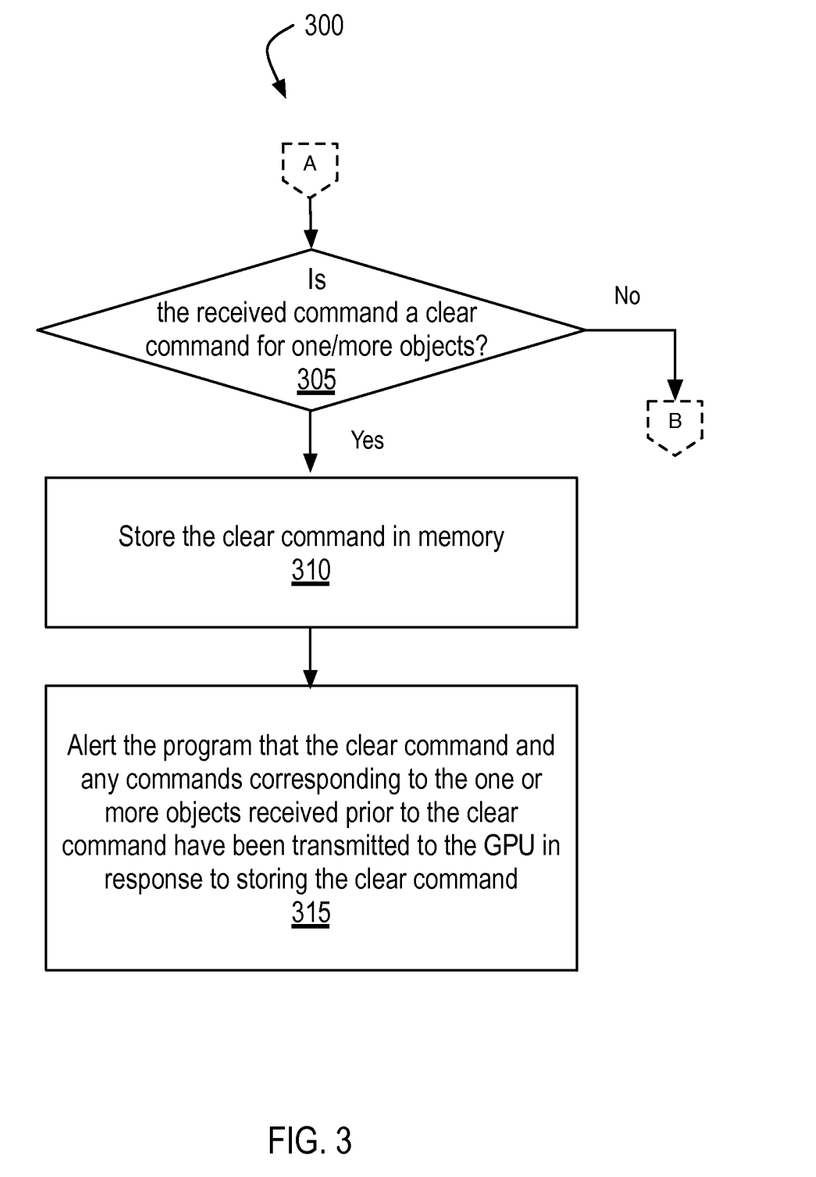
FIG. 3 is a flow chart illustrating additional features of the method of recovering from a GPU failure.

FIG. 3 is a flow chart illustrating additional features 300 of the method 100 of recovering from a GPU failure. After transmitting the command at block 110, the guest graphics driver 220, virtual graphics device 230, or host graphics driver 245 determines that the received command from the application 215 to clear one or more commands/surfaces displayed on a display device. As used herein, a clear command includes a graphics request to render one or more objects/surfaces in a single color, and may be referred to as a clear or color-fill command. In one embodiment, the determination includes determining if a threshold number of objects or amount of display space is cleared. If the command is determined not to be a clear command, or determined to be a clear command that clears less than the threshold, the method 100 resumes at block 115.

If the command is determined to be a clear command or a clear command that clears at least as much as the threshold, at block 310, the guest graphics driver 220, virtual graphics device 230, or host graphics driver 245 stores the clear command, or data corresponding thereto, in a memory location accessible in an instance of GPU failure (e.g., in the memory 235) and forgoes the transmission of the readback request. For example, one or more commands prior to the clear command may become irrelevant to the state of the display data once the clear command is processed (the clear command clearing the data corresponding to the prior commands). The state of the cleared portion of display data is known without a readback request. Additionally, forgoing the readback request conserves processing and transmission bandwidth.

At block 315, the guest graphics driver 220, virtual graphics device 230, or host graphics driver 245 alerts the application 215 that the clear command and any commands corresponding to the one or more objects received prior to the clear command have been transmitted to the GPU 250, or otherwise releases the corresponding portion of the command queue 225, in response to storing the clear command.

Figure 4:
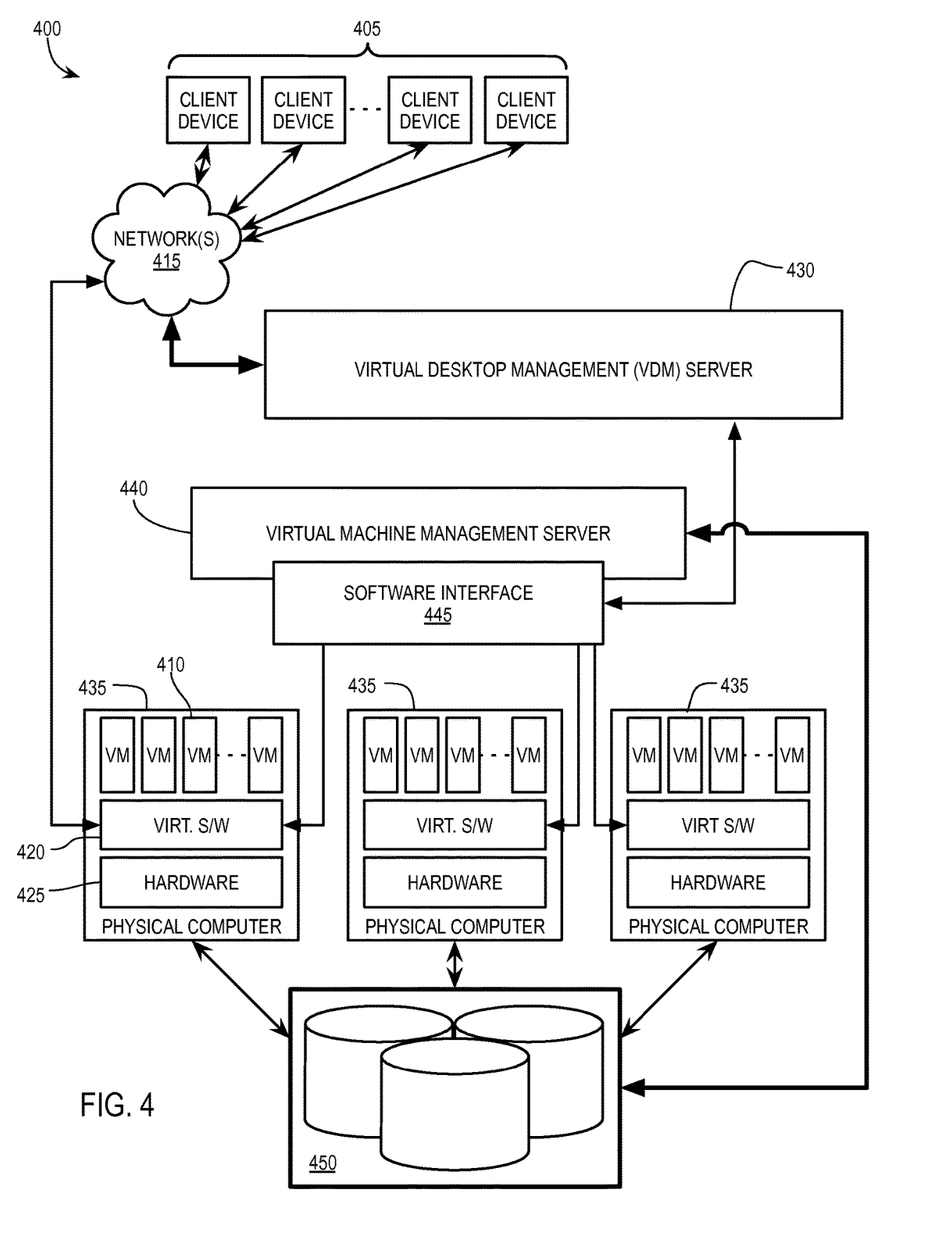
FIG. 4 illustrates, in block diagram form, an exemplary virtualized data center environment including one or more processing systems to implement recovery from a GPU failure.

FIG. 4 illustrates, in block diagram form, an exemplary virtualized data center environment 400 including one or more networked processing systems to implement recovery from a GPU failure as described herein. Client devices 405 access centrally-managed user desktops, such as those implemented by virtual machines (VMs) 410 running in a datacenter, via network(s) 415 (e.g., a local area network or other private or publically accessible wide area network, such as the Internet). These VMs 410 are complete computation environments, containing virtual equivalents of the hardware and system software components of a physical system, as described above with reference to the guest 205, and are typically implemented by an extensive virtualization infrastructure, which includes a variety of software and hardware components, as described above with reference to the host 210. A VM 410, when active, consumes physical compute resources and is managed by a virtualization software layer 420 (e.g., a hypervisor) running on a physical computer 425. The virtualization software layer 420 manages physical resources, e.g., hardware 425, as well as maintains virtual-to-physical hardware mappings. In one embodiment, a physical computer 435, with a corresponding VM 410, virtualization software 420 and hardware 425, implements a virtual graphics stack 200 and performs the methods 100 and 300 described above.

The term "desktop," as used herein, refers to a human interface environment through which users can launch, interact with, and manage applications, settings, and/or data, etc. Virtualized desktops may export user interfaces, e.g., keyboard and mouse input, audio and visual output, to the user from virtual machines running remotely (in the datacenter) or locally on the client, or, in some cases, using a hybrid. The exported visual output may be rendered by the GPU 250 as described herein. The client side of the virtualized desktop typically includes a bitmap representation of the desktop running-wherever it is being run. Input to and output from the virtualized desktop are reflected in the bitmap representation on the client as it occurs on the virtualized desktop.

Remote access to virtualized desktops is generally provided to client devices 405 through a Virtual Desktop Management (VDM) Server 430. The VDM Server 430 provides virtual desktops to the client devices 405 and manages the corresponding VMs 410 through communications with a software interface 445 of a Virtual Machine Management Server (VMMS) 440. The VMMS 440 is responsible for provisioning and maintaining the multitude of VMs 410 implemented across one or more physical computers 435 as well as the storage 450 utilized by the VMs 410.

Figure 5:
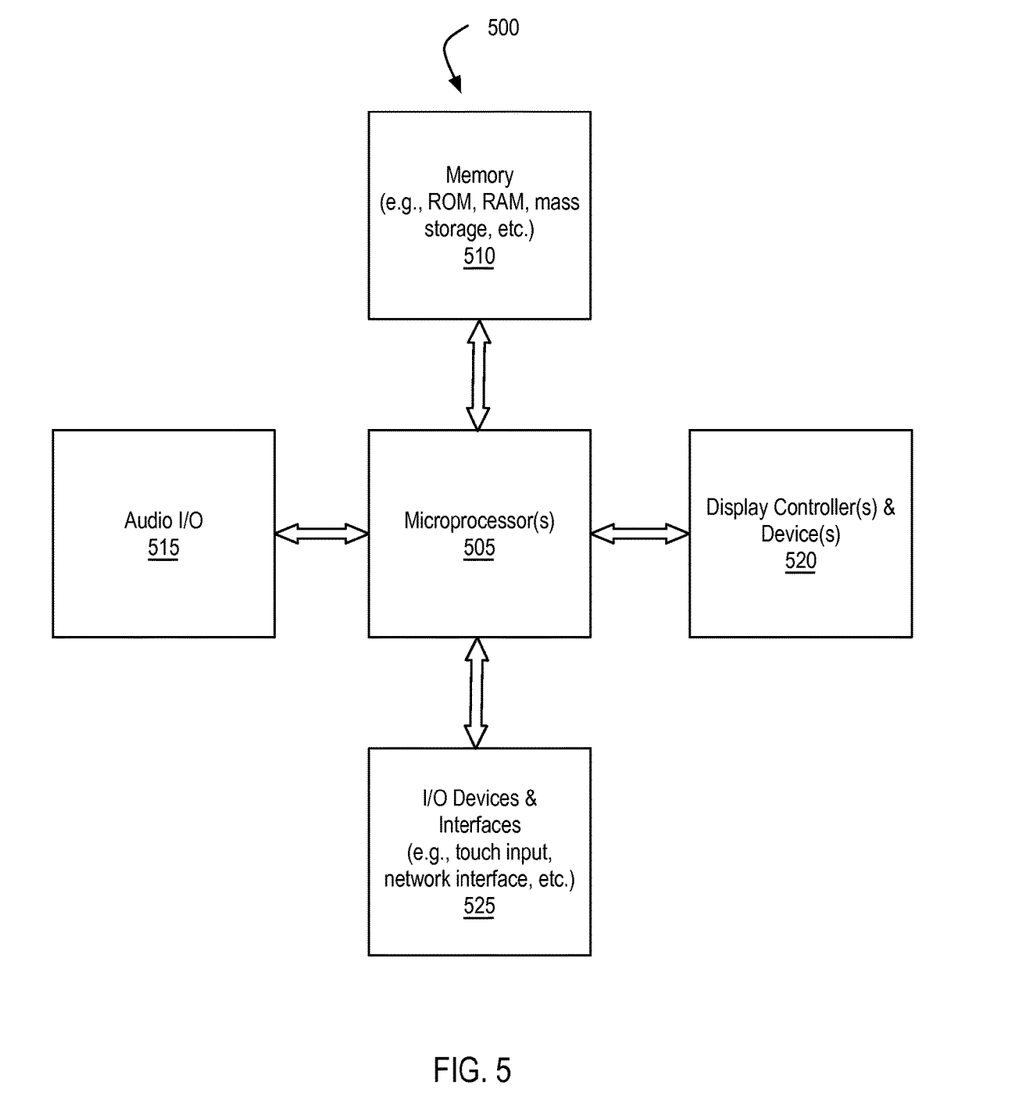
FIG. 5 illustrates, in block diagram form, an exemplary processing system to implement recovery from a GPU failure.

FIG. 5 illustrates, in block diagram form, an exemplary processing system 500 to implement recovery from a GPU failure as described herein. Data processing system 500 includes one or more microprocessors 505 and connected system components (e.g., multiple connected chips). Alternatively, the data processing system 500 is a system on a chip. In one embodiment, the microprocessor(s) 505 include a GPU.

The data processing system 500 includes memory 510, which is coupled to the microprocessor(s) 505. The memory 510 may be used for storing data, metadata, and programs for execution by the microprocessor(s) 505. The memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 510 may be internal or distributed memory. In one embodiment, the command queue 325 and guest memory 335 are implemented within the memory 510.

The data processing system 500 also includes an audio input/output subsystem 515 which may include a microphone and/or a speaker for, for example, playing back music or other audio, receiving voice instructions to be executed by the microprocessor(s) 505, playing audio notifications, etc.

The display controller(s) and device(s) 520 provide a visual user interface for the user. In one embodiment the display controller(s) and device(s) 520 include a GPU.

The data processing system 500 also includes one or more input or output ("I/O") devices and interfaces 525, which are provided to allow a user to provide input to, receive output from, and otherwise transfer data to and from the system. These I/O devices 525 may include a mouse, keypad or a keyboard, a touch panel or a multi-touch input panel, camera, optical scanner, network interface, modem, other known I/O devices or a combination of such I/O devices.

The I/O devices and interfaces 525 may also include a port, connector for a dock, or a connector for a USB interface, FireWire, Thunderbolt, Ethernet, Fibre Channel, etc. to connect the system 500 with another device, external component, or a network. Exemplary I/O devices and interfaces 525 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect the data processing system 500 with another device, external component, or a network and receive stored instructions, data, tokens, etc.

It will be appreciated that one or more buses, may be used to interconnect the various components shown in FIG. 5.

The data processing system 500 is an exemplary representation of one or more of the client devices 405, physical computers 435, VDM server 430, or VMMS 440 described above. The data processing system 500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 500 may be a network computer, server, or an embedded processing device within another device or consumer electronic product. As used herein, the terms computer, device, system, processing system, processing device, and "apparatus comprising a processing device" may be used interchangeably with the data processing system 500 and include the above-listed exemplary embodiments.

It will be appreciated that additional components, not shown, may also be part of the system 500, and, in certain embodiments, fewer components than that shown in FIG. 5 may also be used in a data processing system 500. It will be apparent from this description that aspects of the inventions may be embodied, at least in part, in software. That is, the computer-implemented methods 100 and 300 may be carried out and layers of the virtual graphics stack 200 may be implemented in a computer system or other data processing system 500 in response to its processor or processing system 505 executing sequences of instructions contained in a memory, such as memory 510 or other non-transitory machine-readable storage medium. The software may further be transmitted or received over a network (not shown) via a network interface device 525. In various embodiments, hardwired circuitry may be used in combination with the software instructions to implement the present embodiments. Thus, the techniques are not limited to any specific combination of hardware circuitry and software, or to any particular source for the instructions executed by the data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
    receiving a command from a program to render graphics data on a display device, wherein commands to render graphics data are grouped into batches of one or more commands;
    transmitting a batch of one or more commands, including the command from the program, to a graphics processing unit;

transmitting, in response to transmitting the batch and without receiving a readback request from the program, a readback request to the graphics processing unit to read back at least a portion of the graphics data;

receiving a response to the readback request from the graphics processing unit; and alerting the program that the command has been transmitted to the graphics processing unit in response to receiving the response to the readback request.

2. The computer-implemented method of claim 1, wherein the received response is a pointer to a memory location at which the graphics processing unit has written rendered frame data representing the results of the command transmitted to the graphics processing unit.

3. The computer-implemented method of claim 2, further comprising:

receiving notification of a failure of the graphics processing unit; and transmitting to the graphics processing unit upon recovery from the failure, or to another graphics processing unit, the rendered frame data written in response to the readback request and any additional commands to render the additional graphics requests received subsequent to the transmission of the readback request.

4. The computer-implemented method of claim 1, wherein a readback request is transmitted to the graphics processing unit for each interval of one or more batches.

5. The computer-implemented method of claim 1, wherein the readback request is a pipelined readback request.

6. The computer-implemented method of claim 5, wherein the received response is a pointer to a memory location at which the graphics processing unit has written rendered frame data representing the command transmitted to the graphics processing unit, the method further comprising:

transmitting a query to the graphics processing unit for the pointer.

7. The computer-implemented method of claim 1, further comprising:

receiving a clear command from the program to clear one or more objects displayed on a display device;

storing the clear command in a memory location accessible in an instance of failure of the graphics processing unit; and alerting the program that the clear command and any commands corresponding to the one or more objects received prior to the clear command have been transmitted to the graphics processing unit in response to storing the clear command.

8. A non-transitory computer-readable medium storing instructions, which when executed by a processing device, cause the processing device to perform method comprising:

receiving a command from a program to render graphics data on a display device, wherein commands to render graphics data are grouped into batches of one or more commands;

transmitting a batch of one or more commands, including the command from the program, to a graphics processing unit;

transmitting, in response to transmitting the batch and without receiving a readback request from the program, a readback request to the graphics processing unit to read back at least a portion of the graphics data;

receiving a response to the readback request from the graphics processing unit; and alerting the program that the command has been transmitted to the graphics processing unit in response to receiving the response to the readback request.

9. The non-transitory computer-readable medium of claim 8, wherein the received response is a pointer to a memory location at which the graphics processing unit has written rendered frame data representing the command transmitted to the graphics processing unit.

10. The non-transitory computer-readable medium of claim 9, the method further comprising:

receiving notification of a failure of the graphics processing unit; and transmitting to the graphics processing unit upon recovery from the failure, or to another graphics processing unit, the rendered frame data written in response to the readback request and any additional commands to render the additional graphics requests received subsequent to the transmission of the readback request.

11. The non-transitory computer-readable medium of claim 8, wherein a readback request is transmitted to the graphics processing unit for each interval of one or more batches.

12. The non-transitory computer-readable medium of claim 8, wherein the readback request is a pipelined readback request.

13. The non-transitory computer-readable medium of claim 12, wherein the received response is a pointer to a memory location at which the graphics processing unit has written rendered frame data representing the command transmitted to the graphics processing unit, the method further comprising:

transmitting a query to the graphics processing unit for the pointer.

14. The non-transitory computer-readable medium of claim 8, the method further comprising:

receiving a clear command from the program to clear one or more objects displayed on a display device;

storing the clear command in a memory location accessible in an instance of failure of the graphics processing unit; and alerting the program that the clear command and any commands corresponding to the one or more objects received prior to the clear command have been transmitted to the graphics processing unit in response to storing the clear command.

15. An apparatus comprising:

a processing device, wherein the processing device executes instructions that cause the apparatus to:

receive a command from a program to render graphics data on a display device, wherein commands to render graphics data are grouped into batches of one or more commands;

transmit a batch of one or more commands, including the command from the program, to a graphics processing unit;

transmit, in response to transmitting the batch and without receiving a readback request from the program, a readback request to the graphics processing unit to read back at least a portion of the graphics data;

receive a response to the readback request from the graphics processing unit; and alert the program that the command has been transmitted to the graphics processing unit in response to receiving the response to the readback request.

16. The apparatus of claim 15, wherein the received response is a pointer to a memory location at which the graphics processing unit has written rendered frame data representing the command transmitted to the graphics processing unit.

17. The apparatus of claim 16, wherein the instructions further cause the apparatus to:
- receive notification of a failure of the graphics processing unit; and
- transmit to the graphics processing unit upon recovery from the failure, or to another graphics processing unit, the rendered frame data written in response to the readback request and any additional commands to render the additional graphics requests received subsequent to the transmission of the readback request.

18. The apparatus of claim 15, wherein a readback request is transmitted to the graphics processing unit for each interval of one or more batches.

19. The apparatus of claim 15, wherein the readback request is a pipelined readback request.

20. The apparatus of claim 19, wherein the received response is a pointer to a memory location at which the graphics processing unit has written rendered frame data representing the command transmitted to the graphics processing unit, and wherein the instructions further cause the apparatus to:
- transmit a query to the graphics processing unit for the pointer.

* * * * *